Patented Apr. 15, 1947

2,418,939

UNITED STATES PATENT OFFICE 2,418,939

SULFUR-CONTAINING POLYMERIC COMPOUNDS AND PROCESS FOR PRODUCING THE SAME

Emmette F. Izard, Kenmore, N. Y., assignor to E. I. du Pont de Nemours & Company, Wilmington, Del., a corporation of Delaware No Drawing. Application January 19, 1944, Serial No. 518,878

10 Claims. (Cl. 260—79)

This invention relates to polymeric materials, and more particularly it relates to polymeric materials containing sulfur, and to the method of producing the same.

The term "polymeric material," as used throughout this specification and the appended claims, is intended to designate a macromolecular organic compound containing a recurring unit or units, which units may be cyclic or acyclic in nature, and which are linked together within the compound in chain-like fashion. The compound may be a naturally occurring one or may be partly or wholly synthetic. Cellulose is an example of a naturally occurring polymeric material, while examples of partly or wholly synthetic polymeric materials include such substances as cellulose esters or ethers, the so-called addition polymers including such substances as polyvinyl alcohol and its derivatives, polyacrylic acids and their derivatives, and the so-called condensation polymers, including such substances as the polyesters and polyamides of polycarboxylic acids, synthetic resins and the like. Generally, polymeric materials of the type intended for use with this invention possess an average molecular weight in excess of 1000, and exist in the free state as solids at room temperature and atmospheric pressure.

In my copending application (Q-109), Serial No. 518,877, filed January 19, 1944, there is described a procedure for introducing a thiosulfate functional group in a polymeric material and reacting two of said thiosulfate functional groups of the polymeric material, in the presence of a mild oxidizing agent, to produce a cross-linked polymeric material which exhibits a materially lower solubility in water or other common organic solvent than the original polymer or its thiosulfate derivative.

In copending application (Q-109A) of Emmette F. Izard and Benjamin W. Howk, Serial No. 518,880, filed Jan. 19, 1944, there is disclosed a procedure for producing an isothiourea derivative of a polymeric material which, upon treatment first with an alkaline agent and then with a mild oxidizing agent, is converted into a polymeric material which is insoluble in water and insoluble in the common organic solvents and mixtures thereof.

In copending application (Q-109B) of Paul W. Morgan, Serial No. 518,881, filed January 19, 1944, there is disclosed a procedure of producing a mercaptan-containing polymeric derivative (by the treatment of a polymeric material containing a reactive group with hydrogen sulfide in the presence of an organic base) and reacting two of the said mercaptan groups, in the presence of a mild oxidizing agent, to produce a cross-linked polymeric material.

It is an object of this invention to produce a new and useful sulfur-containing polymer. Another object is to provide a new sulfur-containing polymer which is insoluble in water and the common organic solvents. A further object is to provide a polymeric material containing the group

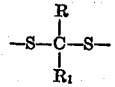

wherein R represents hydrogen, an alkyl, aryl or aralkyl grouping, and $R_1$ represents hydrogen, an alkyl, aryl or aralkyl grouping. A specific object of this invention is to provide a polymeric compound containing one or more of the groups

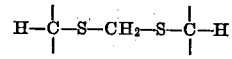

A further object of the invention is to provide a method of producing the aforementioned sulfur-containing polymeric materials, which process is easy of accomplishment and readily controlled. Other objects of the invention will appear hereafter.

The objects of this invention are accomplished, in general, by producing a polymeric material containing a sulfur-functional group (i. e. thiosulfate or mercaptan) and reacting the sulfur-functional group with an aldehyde or ketone or alkylidene dihalide to form a cross-linked product which contains the grouping

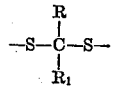

wherein R designates hydrogen, an alkyl, aryl or aralkyl grouping, and $R_1$ designates hydrogen, an alkyl, aryl or aralkyl grouping, and which is insoluble in water, the common organic solvents and mixtures of such solvents. Such insolubility is in distinct contrast to the behavior of the original polymeric materials and their thiosulfate or mercaptan derivatives, which substances, depending on their constitution, are soluble in water or the common organic solvents or mixtures thereof.

The present invention will be more clearly understood by reference to the following detailed examples, it being understood, however, that these examples are illustrative and that the scope of the invention is not to be limited thereto. Throughout the examples, the parts of substances referred to are parts by weight unless otherwise indicated.

Example I

A solution of 160 parts of polyvinyl chloracetate (prepared by the polymerization of vinyl chloracetate in the presence of peroxide) in 640 parts of methyl Cellosolve (monomethyl ether of ethylene glycol) was treated at a temperature of 80° C. with a solution of 310 parts of hydrated sodium thiosulfate in 310 parts of water. The sodium thiosulfate reacted with the polyvinyl chloracetate and the mixture became homogeneous within 5 minutes, after which it was immediately cooled to room temperature. It gave a negative test for sodium thiosulfate. The product was soluble in water and in methyl Cellosolve. It was coagulated by a 50–50 mixture of alcohol and acetone, and analysis indicated that approximately 92% of the chlorine atoms of the chloracetate groups had been replaced by sodium thiosulfate groups.

A methyl Cellosolve solution of the above-mentioned product was cast onto a heated plate to form a thin, transparent film. The dried film, which was still water-soluble, was then treated with an acidic aqueous formaldehyde solution to form a water-insoluble and organic solvent-insoluble product. Analysis of the product indicated that it possessed the structure

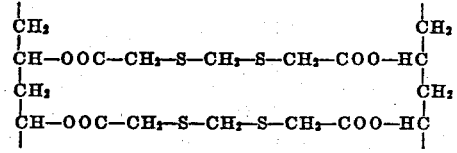

the residual valences of the end C atoms of the structure indicating that these atoms are members of a polymeric chain of the polymeric material.

Example II 200 parts of p-toluene sulfonyl chloride dissolved in 440 parts of benzene were added with stirring to a solution of 100 parts of methyl cellulose (methoxy content of 18%) in 2000 parts of aqueous 4% sodium hydroxide, the temperature of the solution being maintained at approximately 0° C. Within a few minutes, 118 parts of methyl cellulose p-toluene sulfonate (methoxy content of 15.3%, p-toluene sulfonate content of 15%) were obtained as a precipitate.

20 parts of this insoluble material, having first been washed with water and dried, were then dissolved in a mixture of 92 parts of methyl Cellosolve (monomethyl ether of ethylene glycol) and 94 parts of dimethyl formamide. 10 parts of thiourea were added to this solution, and the mixture heated with stirring for 5 hours at 95° C. Sufficient water was then added to precipitate the material, the product being washed with water and dried. 7 parts of this material were dissolved in 93 parts of a 2:1 mixture of dimethyl formamide and methanol, the resulting viscous solution being cast onto a heated plate to form a thin transparent film. This film was then treated with aqueous 3% sodium hydroxide. A portion of the alkali-treated film, when tested with sodium nitroprusside solution, became violet-red in color, indicating the presence of free thiol groups.

A second portion of the alkali-treated film was treated with formaldehyde in the presence of a small amount of sulfuric acid, washed with water, and dried. This film was insoluble in alkali, water and the common organic solvents, including mixtures of methyl Cellosolve and dimethyl formamide. Analysis indicated that it possessed the group —S—CH$_2$—S—. When tested with sodium nitroprusside solution, it gave a negative test for thiol groups and could not be rendered solvent-soluble by treatment with thioglycolic acid.

The above two detailed examples illustrate the present invention by reacting with an aldehyde two specific polymeric materials containing specific reactive sulfur groups, i. e. a thiosulfate derivative obtained by reaction of a thiosulfate with a polyvinyl compound containing a reactive chloracetate group (Example I), and a mercaptan obtained by hydrolyzing, with an alkali, the reaction product of methyl cellulose p-toluene sulfonate and thiourea (Example II). The present invention is not, however, to be so limited. In its broad scope, the present invention relates to reacting, as herein described, of any polymeric material containing a reactive sulfur group selected from the class which consists of thiosulfates and mercaptans.

The polymeric thiosulfate derivative may be obtained by reacting the reactive group of a polymeric material with a thiosulfate selected from the class which consists of alkali metal thiosulfates, ammonium thiosulfates, magnesium thiosulfates, and amine thiosulfates, as disclosed in my copending application (Q-109), Serial No. 518,877, filed January 19, 1944. The mercaptan-containing polymeric material can be obtained by reacting the reactive group of a polymeric material with hydrogen sulfide in the presence of an organic base, such as pyridine, quinoline, picoline, tertiary aliphatic amines such as triethyl amine, and mixed tertiary amines such as dimethyl aniline, as described in copending application (Q-109B) of Paul W. Morgan, Serial No. 518 881, filed January 19, 1944. The mercaptan-containing polymer may also be obtained by hydrolyzing, with an alkali agent, the isothiourea derivative of the polymeric material, as disclosed in copending application (Q-109A) of Emmette F. Izard and Benjamin W. Howk, Serial No. 518,880, filed January 19, 1944.

As examples of polymeric materials which may contain functional groups which are reactive with a thiosulfate or hydrogen sulfide, in the presence of an organic base, to produce a polymeric material having thiosulfate or mercaptan-containing functional groups, the following may be named: vinyl polymers, polyacrylic compounds, polymeric resins, cellulose derivatives, linear condensation polymers, for example, synthetic resins, synthetic linear condensation polyamides, polyesters, polyethers and polyanhydrides, and the like, provided only that the polymeric material contains, or can be made to contain, a reactive or functional group which is reactive with the thiosulfate or hydrogen sulfide to produce a polymeric material having a thiosulfate-containing or mercaptan-functional group. The aforementioned polymeric materials may also be used to produce an isothiourea derivative which can be hydrolyzed with an alkali to produce the mercaptan-containing polymeric material.

As examples of reactive groups which may be contained in the polymeric material to react with the thiosulfate, hydrogen sulfide or thiourea, the following may be named: any functional ester group taken from the class consisting of halogen esters, sulfate esters and sulfonate esters, for example, mono-, di- or trichloracetates, chlorketals, chloracetals, sulfates, alkyl or aryl sulfates, alkyl or aryl sulfonates.

Though as disclosed by the examples it is preferred to produce the insoluble product by reacting the mercaptan or thiosulfate derivative of the polymeric material with formaldehyde in the presence of an acid catalyst, it is to be understood that the invention is not restricted to such aldehyde. Other aldehydes, such as acetaldehyde, butyraldehyde, benzaldehyde, etc. can also be used. The insoluble products obtained by such treatment contain the group $$-S-\underset{\underset{\text{}}{|}}{\overset{R}{C}H}-S-$$

wherein R represents hydrogen, an alkyl, aryl or aralkyl grouping.

It is not essential to employ an aldehyde for the preparation of the permanently insolubilized product. Similar results can be obtained by the treatment of the thiosulfate or mercaptan derivative with an alkylidene dihalide, such as ethylidene dichloride, to yield an insoluble product containing the group $$-S-\underset{\underset{CH_3}{|}}{\overset{\overset{H}{|}}{C}}-S-$$

or the mercaptan and thiosulfate derivative can be treated with a ketone, in which case the product will contain the group $$-S-\underset{\underset{R_1}{|}}{\overset{\overset{R}{|}}{C}}-S-$$

wherein R designates an alkyl, aryl or aralkyl grouping, and R₁ designates an alkyl, aryl or aralkyl grouping.

It is, of course, to be understood that the residual valences of the S atom of the groups $$-S-\underset{\underset{}{|}}{\overset{R}{C}H}-S- \quad -S-\underset{\underset{CH_3}{|}}{\overset{\overset{H}{|}}{C}}-S-$$

and $$-S-\underset{\underset{R_1}{|}}{\overset{\overset{R}{|}}{C}}-S-$$

referred to throughout this specification and the appended claims, are meant to indicate that these S atoms are attached either directly to C atoms present in adjacent chains of the polymeric material or to substituent side chains attached to such C atoms, these S-containing groups thus serving to link together in an insoluble mass adjacent chains of the material. At the same time it is, of course, to be understood that these S-containing groups can also be present in the insolubilized material as links between C atoms or substituent side groups of a single chain of the polymeric material.

As shown in the examples, this invention makes possible the preparation of water- and organic solvent-insoluble and -insensitive shaped articles of polymeric materials. Preferably, a shaped article is prepared from the thiosulfate or mercaptan derivative of the polymer and then treated with formaldehyde, as herein described. However, this is not essential, and the entire treatment, including modification of the polymer to insert a reactive group and subsequent treatment to produce the thiosulfate or mercaptan derivative thereof and then with formaldehyde as herein described, can, if desired, be conducted on a pre-formed polymeric article. Thus, for example, a formed structure such as a sheet of regenerated cellulose can be surface-esterified with p-toluene sulfonyl chloride, the resulting ester then being treated in sheet form to produce the thiosulfate or mercaptan derivative, and subsequently treating said derivative with formaldehyde, as herein described, to form a water- and organic solvent-insoluble and -insensitive sheet.

This invention provides a simple and easily controlled process for the preparation of new water- and organic solvent-insoluble and -insensitive polymeric materials from polymeric materials containing a thiosulfate or mercaptan group. The process of this invention lends itself to the treatment of pre-formed articles of a polymeric material. The process does not give rise to the formation of undesirable by-products, the polymeric material finally obtained being substantially free of such compounds and possessing a light color.

Since it is obvious that many changes and modifications can be made in the above-described details without departing from the nature and spirit of the invention, it is to be understood that the invention is not to be limited to the details described herein except as set forth in the appended claims.

I claim:

1. A saturated macromolecular organic compound having at least one recurring unit linked together in chain-like fashion in the molecule, an average molecular weight in excess of 1000 and containing sulfur, and wherein two bivalent sulfur atoms are attached by the bivalent bridging radical $$-\underset{\underset{R_1}{|}}{\overset{\overset{R}{|}}{C}}-$$

wherein R and R₁ are members of the group consisting of hydrogen, alkyl, aryl and aralkyl, and the other valence of each of said sulfur atoms is correspondingly attached through a bivalent bridging radical, similar to the first-named bridging radical, to a carbon atom which, in turn, is attached to a member of the group consist of (a) an oxygen atom directly attached to the chain of the macromolecular compound, (b) an oxygen atom directly attached to the chain of the macromolecular compound and to a second oxygen atom by at least one bond, and (c) an oxygen atom directly attached to the chain of the macromolecular compound and to a second oxygen atom by two bonds.

2. A saturated macromolecular organic compound having at least one recurring unit linked together in chain-like fashion in the molecule, an average molecular weight in excess of 1000 and containing sulfur, and wherein two bivalent sulfur atoms are attached by the bivalent bridging radical $$-\underset{\underset{R_1}{|}}{\overset{\overset{R}{|}}{C}}-$$

wherein R and R₁ are members of the group consisting of hydrogen, alkyl, aryl and aralkyl, and the other valence of each of said sulfur atoms is correspondingly attached through a bivalent bridging radical, similar to the first-named bridging radical, to a carbon atom which, in turn, is attached through an oxygen atom directly to the chain of the macromolecular compound.

3. A saturated macromolecular organic compound having at least one recurring unit linked together in chain-like fashion in the molecule, an average molecular weight in excess of 1000 and containing sulfur, and wherein two bivalent sulfur atoms are attached by the bivalent bridging radical

wherein R and R₁ are members of the group consisting of hydrogen, alkyl, aryl and aralkyl, and the other valence of each of said sulfur atoms is correspondingly attached through a bivalent bridging radical, similar to the first-named bridging radical, to a carbon atom which, in turn, is attached through an oxygen atom directly to the chain of the macromolecular compound and to a second oxygen atom by at least one bond.

4. A saturated macromolecular organic compound having at least one recurring unit linked together in chain-like fashion in the molecule, an average molecular weight in excess of 1000 and containing sulfur, and wherein two bivalent sulfur atoms are attached by the bivalent bridging radical

wherein R and R₁ are members of the group consisting of hydrogen, alkyl, aryl and aralkyl, and the other valence of each of said sulfur atoms is correspondingly attached through a bivalent bridging radical, similar to the first-named bridging radical, to a carbon atom which, in turn, is attached through an oxygen atom directly to the chain of the macromolecular compound and to a second oxygen atom by two bonds.

5. A saturated polymeric material having an average molecular weight in excess of 1000 and containing the structural unit

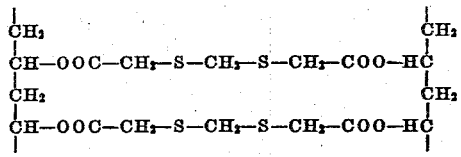

6. A method which comprises treating a polymeric material selected from the class which consists of mercaptan and thiosulfate derivatives of a saturated macromolecular organic compound having at least one recurring unit linked together in chain-like fashion in the molecule and an average molecular weight in excess of 1000 with a substance selected from the class which consists of aldehydes, alkylidene dihalides and ketones.

7. A method which comprises treating a mercaptan derivative of a saturated macromolecular organic compound having at least one recurring unit linked together in chain-like fashion in the molecule and an average molecular weight in excess of 1000 with an aldehyde.

8. A method which comprises treating a thiosulfate derivative of a saturated macromolecular organic compound having at least one recurring unit linked together in chain-like fashion in the molecule and an average molecular weight in excess of 1000 with an aldehyde.

9. A method which comprises treating the reaction product of polyvinyl chloracetate and sodium thiosulfate with formaldehyde.

10. A method which comprises hydrolyzing the reaction product of methyl cellulose p-toluene sulfonate and thiourea to produce the corresponding mercaptan, and treating such mercaptan with formaldehyde.

EMMETTE F. IZARD.

REFERENCES CITED

The following references are of record in the file of this patent:

UNITED STATES PATENTS

| Number | Name | Date |
|---|---|---|
| 2,216,044 | Patrick | Sept. 24, 1940 |

FOREIGN PATENTS

| Number | Country | Date |
|---|---|---|
| 468,369 | British | June 30, 1937 |

OTHER REFERENCES

Pages 425 to 427, 430, 431, Patterson et al., "American Dyestuff Reporter," Aug. 18, 1941.